United States Patent [19]
Kumakura et al.

[11] Patent Number: 5,726,895
[45] Date of Patent: Mar. 10, 1998

[54] COMBINED TWO COMPUTER SYSTEM

[75] Inventors: Tatsuro Kumakura, Gotenba; Hideyuki Hirohama, Oshino-mura, both of Japan

[73] Assignee: Fanuc Ltd., Yamanashi, Japan

[21] Appl. No.: 351,419

[22] PCT Filed: Apr. 21, 1994

[86] PCT No.: PCT/JP94/00659
§ 371 Date: Dec. 15, 1994
§ 102(e) Date: Dec. 15, 1994

[87] PCT Pub. No.: WO94/25908
PCT Pub. Date: Nov. 10, 1994

[30] Foreign Application Priority Data

Apr. 28, 1993 [JP] Japan ................... 5-123244

[51] Int. Cl.$^6$ ............................................. G06F 15/00
[52] U.S. Cl. .................. 364/474.11; 364/134; 395/474
[58] Field of Search ................... 364/474.11, 474.12, 364/474.23, 474.24, 131, 132, 134, 136; 395/475, 474, 444

[56] References Cited

U.S. PATENT DOCUMENTS

| | | |
|---|---|---|
| 4,212,057 | 7/1980 | Devlin et al. ................... 364/200 |
| 4,878,002 | 10/1989 | Heatzig et al. ................... 364/132 X |
| 4,882,670 | 11/1989 | Isobe et al. ................... 364/134 |
| 5,025,365 | 6/1991 | Mathur et al. ................... 364/200 |
| 5,072,374 | 12/1991 | Sexton ................... 364/131 X |
| 5,224,031 | 6/1993 | Tanaka et al. ................... 364/140 |
| 5,252,899 | 10/1993 | Kawamura et al. ........... 364/474.11 X |
| 5,291,416 | 3/1994 | Hutchins ................... 364/474.11 X |
| 5,297,265 | 3/1994 | Frank et al. ................... 395/400 |
| 5,390,103 | 2/1995 | Sakakibara ................... 364/131 |

*Primary Examiner*—Paul P. Gordon
*Attorney, Agent, or Firm*—Staas & Halsey

[57] ABSTRACT

With reference to addresses outputted from the processor of the CNC section and the processor of the other system, the mediation circuit monitors the access condition of the work RAMs of both systems and the shared RAM. Also, when one processor accesses the work RAM of the other system, the mediation circuit sets the other processor inoperative and controls both the address and data bidirectional buffers to enable one processor to directly access the devices of the other system. When one processor accesses the shared RAM, the mediation circuit controls the bidirectional buffers so that writing or reading data into or from the shared RAM is allowed only when the other processor is not accessing the shared RAM.

7 Claims, 1 Drawing Sheet

COMBINED TWO COMPUTER SYSTEM

TECHNICAL FIELD

The present invention relates to two computer systems, one for executing numerical control function and the other for preparing programs adapted to different machines, which are combined through a buffer so that the access from one computer system to the other and vice versa can readily be made available.

BACKGROUND ART

It is known that a computer-controlled numerical control apparatus (CNC apparatus) comprises one computer system section to perform functions relating to CNC (hereinafter referred to as CNC section) and the other computer system to create machining or processing programs adapted to individual machines such as machine tools or else (hereinafter referred to as personal computer section).

In a type of known CNC apparatuses, the circuit is composed so that the input/output signals of the CNC section are compatible with the input/output signals of the personal computer section in order for the necessary information such as the present position of the tool and input/output of the data to be readily exchanged between the CNC section and personal computer section.

Another type of apparatus comprises two buffers interposed between the CNC section and the personal computer section, with a shared RAM disposed between these two buffers, whereby signal exchange is executed between the CNC section and the personal computer section through this shared RAM.

However, the former conventional CNC apparatus, which is a type allowing the direct signal exchange between the CNC section and the personal computer section, requires a complicated circuit configuration which is, for example, used for making a judgement, prior to the signal exchange between the CNC section and the personal computer section, as to whether one is ready for transmitting signals and the other is in a condition for receiving the signals.

On the other hand, the latter conventional CNC apparatus, which is a type using a shared RAM for the exchange of signals between the CNC section and the personal computer section, requires an IC circuit such as a latch in addition to the shared RAM in order to control the alternate write/read operations into/from the shared RAM.

SUMMARY OF THE INVENTION

Thus, an object of the present invention is to combine the two computer systems, one for performing the CNC function of the computer-controlled numerical control apparatus and the other for preparing the programs adapted to the individual machines such as machine tools, in order to make possible the access from one computer system to the other and vice versa through buffer.

In order to accomplish the above object, a first aspect of the present invention provides combined two computer systems which comprise: a first computer system including a processor, a memory and other device; a second computer system similarly including a processor, a memory and other device; a buffer for connecting buses of the first and second computer systems; a processor operation controller for rendering the second computer system operative or inoperative in response to an input signal; and mediation circuit for monitoring an address outputted from the processor of the first computer system, judging which device of the first or second computer systems corresponds to the outputted address, and outputting a signal to the processor operation controller on the basis of the judgement, thereby allowing the first computer system to access the devices of the second computer system via the buffer.

Preferably, the buffer regulates the flow of a signal passing therethrough from one direction to the other or vice versa in response to a direction signal received, while the mediation circuit gives the buffer a direction signal in response to a read/write signal supplied from the first computer system, thereby enabling the first computer system to write information into the devices of the second computer system via the buffer or to read information stored in the devices of the second computer system.

A second aspect of the present invention provides combined two computer systems which comprise: a first computer system including a processor, a memory and other device; a second computer system similarly including a processor, a memory and other device; a bidirectional address bus for connecting address buses of the first and second computer systems, and a bidirectional data bus for connecting data buses of the first and second computer systems; first and second processor operation controller for rendering the first and second computer systems operative or inoperative in response to an input signal; and a mediation circuit for monitoring addresses outputted from the processors of the first and second computer systems, judging which of the devices of the first and second computer systems is accessed by the processor of the first or second computer systems in response to a read/write signal supplied from either the processor of the first computer system or the processor of the second computer systems, outputting signal to the first or second processor operation controller on the basis of the judgement, and giving direction signals to the bidirectional address bus and the bidirectional data bus to regulate the direction of flow of signal from one to the other, thereby enabling the first computer system to write information into the devices of the second computer system via the buffer or to read information stored in the devices of the second computer system, or, alternatively, enabling the second computer system to write information into the devices of the first computer system via the buffer or to read information stored in the devices of the first computer system.

A third aspect of the present invention provides combined two computer systems which comprises: a first computer system including a processor, a memory and other device; a second computer system similarly including a processor, a memory and other device; a shared RAM; a buffer having one end connected to the bus of the first computer system and the other end selectively connected to the bus of the second computer system or the shared RAM; a switch for switching the other end of the buffer between the bus of the second computer system and the shared RAM in response to an input signal; a processor operation controller for rendering the second computer system operative or inoperative in accordance to an input signal; and mediation circuit for monitoring an address outputted from the processor of the first computer system, judging which of the devices of the first and second computer systems or the RAM corresponds to the address, and outputting necessary signals to the processor operation controller and the switch on the basis of the judgement, thereby enabling the first computer system to selectively access the second computer system or the shared RAM via the buffer.

It is preferable that the buffer regulates the flow of a signal passing therethrough from one direction to the other or vice versa in response to a direction signal received, while the mediation circuit gives the buffer a direction signal in response to a read/write signal supplied from the first computer system, thereby enabling the first computer system to write information into the devices of the second computer system or the shared RAM via the buffer or to read information stored in the devices of the second computer system or the shared RAM.

A fourth aspect of the present invention provides combined two computer systems which comprises: a first computer system including a processor, a memory and other device; a second computer system similarly including a processor, a memory and other device; first and second bidirectional address buffers for connecting address buses of the first and second computer systems; first and second bidirectional data buffers for connecting data buses of the first and second computer systems; a shared RAM connected to both an address bus, branching out of an address bus connecting the first and second bidirectional address buffers, and a data bus branching out of a data bus connecting the first and second bidirectional data buffers; first address buffer switch for connecting the first bidirectional address buffer to either the second bidirectional address buffer or the shared RAM in response to an input signal, and second address buffer switch for connecting the second bidirectional address buffer to either the first bidirectional address buffer or the shared RAM in response to an input signal, and further, first data buffer switch for connecting the first bidirectional data buffer to either the second bidirectional data buffer or the shared RAM in response to an input signal, and second data buffer switch for connecting the second bidirectional data buffer to either the first bidirectional data buffer or the shared RAM in response to an input signal; first and second processor operation controllers for setting the processors of the first and second computer systems operative or inoperative in response to an input signal; and mediation circuit for monitoring addresses outputted from the processors of the first and second computer systems, judging which of the devices of the first and second computer systems or the shared RAM is accessed by the processor of the first or second computer system in response to a read/write signal supplied from either of the processors of the first and second computer systems, and, according to the judgement, outputting necessary signals to the first and second processor operation controllers, the first and second address buffer switch and the first and second data buffer switches and giving directional signals to the first and second bidirectional address buffers and the first and second bidirectional data buffers to regulate direction of the flow of signal from one to the other, thereby enabling the first computer system to write information into the devices of the second computer system or the shared RAM via the first bidirectional data buffer or to read information stored in the devices of the second computer system or the shared RAM, or, alternatively, enabling the second computer system to write information into the devices of the first computer system or the shared RAM via the second bidirectional data buffer or to read information stored in the devices of the first computer system or the shared RAM.

Preferably, one of the first computer system and the second computer system is for executing numerical control, while the other is for preparing programs adapted to individual machines.

It is further preferable that the device constituting the first and/or second computer systems not only includes a work random access memory for the processor, but also includes at least one of a local random access memory, a read only memory, an interrupt controller and a communication control integrated circuit.

DETAILED DESCRIPTION OF THE PREFERRED EMBODIMENTS

Figure 1:
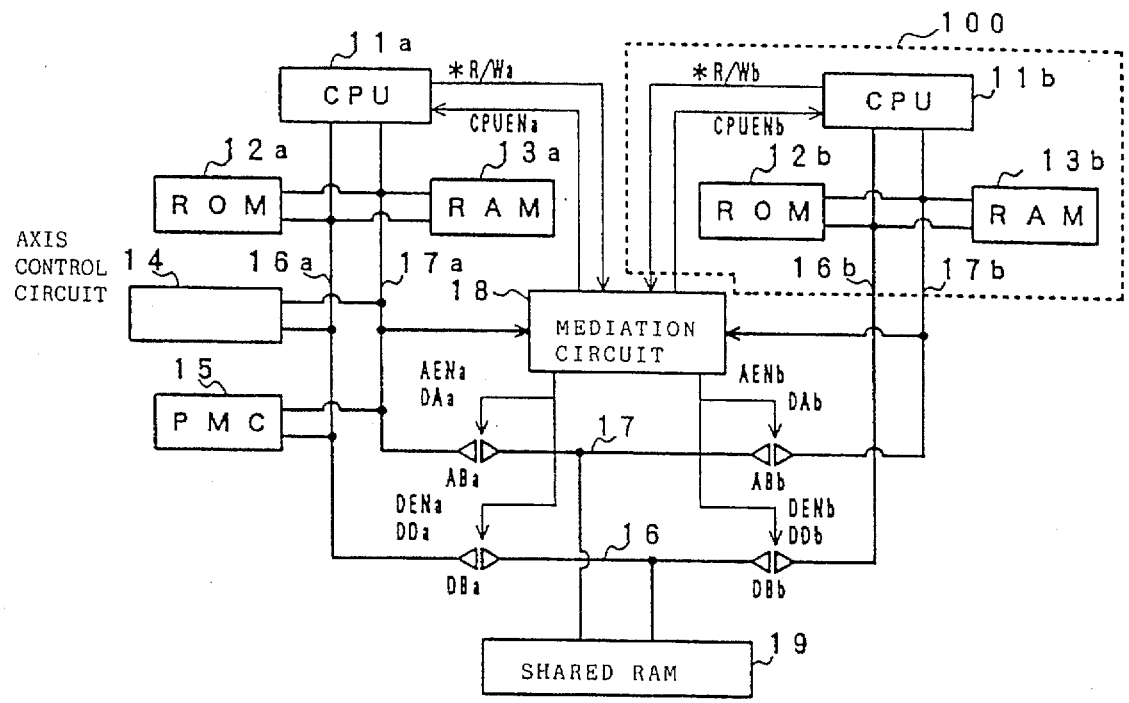
FIG. 1 is a schematic diagram showing essential components of the computer-based numerical control apparatus in accordance with one embodiment of the present invention.

FIG. 1 is a schematic diagram showing essential components of the computer-based numerical control apparatus (i.e. CNC apparatus) in accordance with one embodiment of the present invention. This CNC apparatus comprises a numerical control function executing section (hereinafter referred to as CNC section), which is a computer system consisting of processor (hereinafter referred to as CPU section) $11a$ for executing the numerical control, ROM $12a$ for storing control programs, work RAM $13a$ for memorizing machining programs, various set data and other data under processing, axis control circuit 14 for executing drive control of a servo motor for each axis of a machine, and programmable machine controller (PMC) 15 for executing sequence controls, and another computer system (hereinafter referred to as personal computer section), which is indicated by a reference numeral 100 in FIG. 1 and consists of a processor (hereinafter referred to also as CPU) $11b$ capable of creating programs other than those for numerical controls, for example, programs adapted to individual machines, ROM $12b$ storing control programs, and work RAM $13b$ for storing various data.

In the CNC section, the ROM $12a$, the RAM $13a$, the axis control circuit 14 and the PMC 15 are respectively connected to the CPU $11a$ through the data bus $16a$ and the address bus $17a$. On the other hand, in the personal computer section, the ROM $12b$ and the RAM $13b$ are respectively connected to the CPU $11b$ via the data bus $16b$ and the address bus $17b$.

Furthermore, the data bus $16a$ and the address bus $17a$ of the CNC section are connected to a first data buffer DBa and a first address buffer ABa, respectively. On the other hand, the data bus $16b$ and the address bus $17b$ of the personal computer section are connected to second data buffer DBb and second address buffer ABb, respectively. Each of these buffers DBa, ABa, DBb and ABb is a bidirectional buffer of a type designed to regulate the direction of the transmission of the received direction signal passing therethrough so that the direction signal is allowed to be transmitted either from one computer system to the other computer system or shared RAM or from the other computer system or shared RAM to one computer system.

Furthermore, the first address buffer ABa and the second address buffer ABb are connected via a bus 17, and the bus 17 is also connected to a shared RAM 19. The first data buffer DBa and the second data buffer DBb are connected via a bus 16, and the bus 16 is also connected to the shared RAM 19.

The address bus $17a$, connecting the CPU $11a$ of the CNC section and the first address buffer ABa, is further connected to a mediation circuit 18 which will be described later, while address bus 17b, connecting the CPU 11b of the personal computer section 100 and the second address buffer ABb, is also connected to the mediation circuit 18, whereby the mediation circuit 18 monitors the values of addresses outputted from each CPU. Moreover, the mediation circuit 18 receives read/write signals *R/Wa and *R/Wb supplied from the CPU 11a of the CNC section or the CPU 11b of the personal computer section.

Each of these read/write signals *R/Wa and *R/Wb takes any of the values "1" and "0", of which, for example, the former is predetermined to correspond to the read command, while the latter to correspond to the write command.

Furthermore, the mediation circuit 18 outputs enable signals CPUENa and CPUENb to the CPU 11a and the CPU 11b respectively for controlling their operations, outputs enable signals DENa, DENb, AENa and AENb to the first and second bidirectional data buffers DBa, DBb and first and second bidirectional address buffers ABa and ABb respectively for controlling their operations, and further outputs direction signals DDa, DDb, DAa and DAb for regulating the flow direction of a signal passing through each buffer. Enable signal to be turned on out of various enable signals and the direction of each buffer are determined based on an analyzation of the mediation circuit 18 regarding the input signals; that is, analyzation of the addresses from the two CPU's and the read/write signal from one of the two CPU's.

Figure 2A:
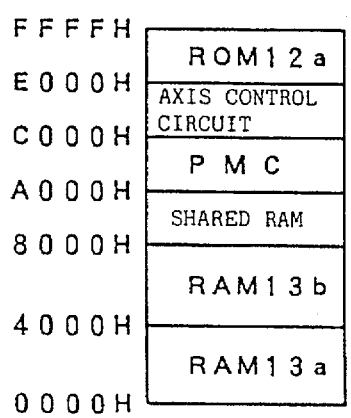
FIGS. 2(A) and 2(B) are views showing address maps corresponding to the CNC section and the personal computer section in accordance with the above embodiment of the present invention.
Figure 2B:
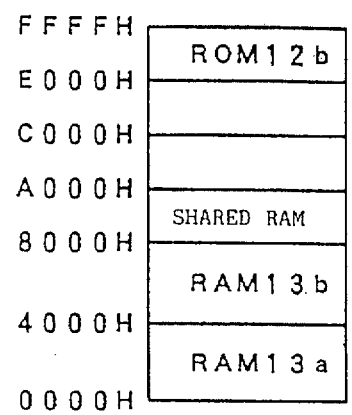

FIG. 2 is an example of address allocation, wherein allocation (a) is dedicated to the devices of the CNC section while allocation (b) is dedicated to the devices of the personal computer section 100, each being expressed in terms of hexadecimal notation (i.e. 0 through 9 and A through F). By the way, the last H of each address is an indication of hexadecimal notation. As illustrated in FIG. 2, the work RAM 13a of the CNC section, the work RAM 13b of the personal computer section and the shared RAM 19 are allocated with the common address to both the CNC section and the personal computer section. Other devices have their specific addresses allocated correspondingly and according to individual systems.

An operation of the mediation circuit 18 will be explained below with reference to a case where the CPU 11a of the CNC section is expected to access the shared RAM 19.

When the mediation circuit 18 receives, for example, an address value "9000H" from the CPU 11a of the CNC section via the address bus 17a, the mediation circuit 18 recognizes that the CPU 11a is trying to access the shared RAM 19. Then, the mediation circuit 18 checks whether or not the shared RAM 19 is being presently accessed by the other CPU. That is, it is checked if an address value, received via the address bus 17b from the CPU 11b of the personal computer section, is within a range of the shared RAM whose allocated address value ranges from 8000H to A0000H.

When it has been confirmed that the CPU 11b of the personal computer section is not presently accessing the shared RAM, or when it has been confirmed that access of the CPU 11b of the personal computer section to the shared RAM has been completed after the lapse of the time required for the access, the enable signals DENa and AENa are both turned on and given to the data buffer DBa and address buffer ABa belonging to the CNC section. Furthermore, the address buffer ABa is given a direction signal DAa for setting a signal flow direction from the CPU 11a to the shared RAM 19. As a result, the CPU 11a can access the shared RAM 19.

In the case where the read/write signal *R/Wa, supplied from the CPU 11a and received by the mediation circuit 18, is a read command, the data buffer DBa is given a direction signal DDa for setting a signal flow direction from the shared RAM 19 to the CPU 11a, whereby the information stored in the shared RAM 19 is read and sent to the CNC section. When the read/write signal *R/Wa is a write command, the data buffer DBa is given a direction signal DDa for setting a signal direction from the CPU 11a to the shared RAM 19, whereby the information of the CNC section is sent and written into the shared RAM 19.

Access from the CPU 11b of the personal computer section to the shared RAM 19 is made in the same manner. That is, when it has been confirmed that the CPU 11b of the CNC section is not presently accessing the shared RAM, or when it has been confirmed that access of the CPU 11b of the CNC section to the shared RAM has been completed after the lapse of the time required for the access, the enable signals DENb and AENb are both turned on and given to the data buffer DBb and address buffer ABb. Furthermore, the address buffer ABb is given a direction signal DAb for setting a signal direction from the CPU 11b to the shared RAM 19, while the signal direction of the data buffer DBb is selected depending on whether the read/write signal *R/Wb supplied from the CPU 11b is a read command or write command. As a result, the CPU 11b of the personal computer section can access the shared RAM 19 to read or write data.

Next, an operation of the mediation circuit 18 will be explained below with reference to a case where the CPU 11a of the CNC section accesses the work RAM 13b of the personal computer section.

When the mediation circuit 18 receives, for example, an address value "5000H" from the CPU 11a of the CNC section via the address bus 17a, the mediation circuit 18 recognizes that the CPU 11a is trying to access the work RAM 13b of the personal computer section. Then, the mediation circuit 18 carries out the following procedure for combining the CNC section and the personal computer section.

That is, the mediation circuit 18 turns off the enable signal CPUENb for the CPU 11b to interrupt the operation of the CPU 11b. Furthermore, the enable signals DENa and AENa for the data buffer DBa and the address buffer ABa are turned on. The enable signals DENb and AENb for the data buffer DBb and the address buffer ABb are also turned on. Furthermore, the direction signals DAa and DAb of the address buffers ABa and ABb are set to instruct the direction from the CPU 11a of the CNC section to the CPU 11b of the personal computer section. Moreover, in the case where the read/write signal *R/Wa, supplied from the CPU 11a of the CNC section, is a read command, the mediation circuit 18 sends the data buffers DBa and DBb the direction signals DDa and DDb for a signal direction from the CPU 11b of the personal computer section to the CPU 11a of the CNC section. In the case where the read/write signal *R/Wa is a write command, the mediation circuit 18 sends the data buffers DBa and DBb the direction signals DDa and DDb for a signal direction from the CPU 11a of the CNC section to the CPU 11b of the personal computer section.

This enables the CPU 11a of the CNC section to access the work RAM 13b via the address bus 17a, the address buffer ABa, the address bus 17, the address buffer ABb and the address bus 17b, and to write data into the RAM 13b of the personal computer section via the data bus 16a, the data buffer DBa, the data bus 16, the data buffer DBb and the data bus 16b (in the case of a read command). On the contrary, in the case of a write command, data stored in the work RAM 13b of the personal computer section is transferred to the CNC section via the data bus 16b, the data buffer DBb, the data bus 16, the data buffer DBa and the data bus 16a.

The access to the work RAM 13a of the CNC section by the CPU 11b of the personal computer section is made in a similar manner. That is, the mediation circuit 18 turns off the enable signal CPUENa for the CPU 11a to interrupt the operation of the CPU 11a, turns on all the enable signals DENa, AENa, DBNb and AENb of the buffers DBa, ABa, DBb and ABb, and sets the direction signals DAa and DAb for the bidirectional address buffers ABa and ABb for direction from the CPU 11b of the personal computer section to the CPU 11a of the CNC section. Moreover, in the case where the read/write signal *R/Wb, supplied from the CPU 11b of the personal computer section, is a read command, the mediation circuit 18 sends the data buffers DBa and DBb the direction signals DDa and DDb for setting a signal direction from the CPU 11a of the CNC section to the CPU 11b of the personal computer section. In the case where the read/write signal *R/Wb is a write command, the mediation circuit 18 sends the data buffers DBa and DBb the direction signals DDa and DDb for setting a signal flow direction from the CPU 11b of the personal computer section to the CPU 11a of the CNC section.

Whereupon, the CPU 11b of the personal computer section accesses the RAM 13a via the address bus 17b, the bidirectional address buffer ABa, the address bus 17, the bidirectional address buffer ABa and the address bus 17a, and writes data into the RAM 13a of the CNC section via the data bus 16b, the data buffer DBb, the data bus 16, the data buffer DBa and the data bus 16b (in the case of a wrote command). Also, in the case of a read command, data stored in the RAM 13a is read out via the data bus 16a, the data buffer DBa, the data bus 16, the data buffer DBb and the data bus 16b.

As described in the foregoing, in the present embodiment, the CPU 11a of the CNC section and the CPU 11b of the personal computer section are connected through the buffers capable of not only selectively setting each of these CPU's either operative or inoperative but also capable of changing the direction of the signal from one to another, thereby making possible the access of one section to the work RAM 13a, 13b of the other section, and vice versa. Furthermore, the CPUs of both systems are allowed to access the shared RAM 19.

The above-described embodiment shows an example whereon the direct access of one system to the work RAM 13a, 13b of the other system and vice versa; however, the direct access to any of the devices such as the interrupt controller, communication control IC, etc. can also be made in a similar manner.

The CPU 11a in the CNC section can access the devices within its system such as ROM 12a, RAM 13a, axis control circuit 14 and PNC 15 by normal procedure this case, the mediation circuit 18 will not operate. When the CPU 11b in the personal computer section accesses its own ROM 12b or RAM 13b, the mediation circuit 18 will not operate either.

The above-described embodiment shows an example wherein the shared RAM 19 is interposed between two bidirectional buffers so that one CPU can access the devices belonging to the other CPU or selectively access this shared RAM. However, since the purpose of the present invention is to enable one computer system to access the other computer system, the shared RAM 19 can be omitted from these combined two computer systems. When such an omission is made, the bidirectional buffers can be integrated into a total of two buffers, i.e. a single address buffer AB integrating the address buffers ABa and ABb and a single data buffer DB integrating the data buffers DBa and DBb. The mediation circuit 18 would give both of the address buffer AB and the data buffer DB the direction signal for setting a signal flow direction from the first computer system to the second computer system or vice versa.

In the case where one computer system (e.g. the personal computer section) needs to read data from or write data in the other computer system (i.e. CNC section), while the other computer system does not need to read data from or write data in the one computer system, an address buffer AB may be a unidirectional type, although the data buffer must be a bidirectional type for executing both reading and writing operations. Still further, if only the reading operation without writing operation is required in the above case, the data buffer then can be unidirectional.

We claim:

1. Combined two computer systems comprising:
    a first computer system having a processor, a memory and a bus;
    a second computer system having a processor, a memory and a bus;
    a shared RAM;
    a buffer having one end connected to the bus of said first computer system and the other end selectively connected to the bus of said second computer system or said shared RAM;
    switching means for switching said the other end of said buffer between the bus of said second computer system and said shared RAM in response to a first input signal;
    processor operation control means for setting said second computer system operative or inoperative in accordance with a second input signal; and
    a mediation circuit to monitor an address outputted from the processor of said first computer system, to judge which of devices of said second computer system or said shared RAM corresponds to said address, and to output signals to said processor operation control means and said switching means on the basis of the judgment, thereby enabling said first computer system to selectively access said second computer system or said shared RAM via said buffer.

2. Combined two computer system in accordance with claim 1, wherein said buffer sets a flow direction of a signal passing therethrough from one to another or vice versa in response to a direction signal received, while said mediation circuit gives said buffer a direction signal in response to a read/write signal supplied from said first computer system, thereby enabling said first computer system to write information into the devices of said second computer system or said shared RAM via said buffer or to read information stored in the devices of said second computer system or said shared RAM.

3. Combined two computer systems in accordance with claim 2, wherein said buffer is a bidirectional buffer.

4. Combined two computer systems comprising:
    a first computer system having a processor, a memory, a data bus and an address bus;
    a second computer system having a processor, a memory, a data bus and an address bus;
    first and second bidirectional address buffers to connect said address buses of said first and second computer systems;
    first and second bidirectional data buffers to connect said data buses of said first and second computer systems;

a shared RAM connected to a third address bus and branching from said third address bus to connect said first and second bidirectional address buffers, and connected to a third data bus and branching from said third data bus to connect said first and second bidirectional data buffers;

first address buffer switching means for connecting said first bidirectional address buffer to either said second bidirectional address buffer or said shared RAM in response to a first input signal;

second address buffer switching means for connecting said second bidirectional address buffer to either said first bidirectional address buffer or said shared RAM in response to a second input signal;

first data buffer switching means for connecting said first bidirectional data buffer to either said second bidirectional data buffer or said shared RAM in response to a third input signal;

second data buffer switching means for connecting said second bidirectional data buffer to either said first bidirectional data buffer or said shared RAM in response to a fourth input signal;

first and second processor operation control means for setting the processors of said first and second computer systems operative or inoperative in response to a fifth input signal; and a mediation circuit to monitor addresses outputted from the processors of said first and second computer system, to judge which of devices of said first and second computer systems or said shared RAM is accessed by the processor of said first or second computer system in response to a read/write signal supplied from either of the processors of said first and second computer systems, to output signals to said first or second processor operation control means, said first or second address buffer switching means and said first and second data buffer switching means on the basis of the judgement, and to give direction signals to said first and second bidirectional address buffers and said first and second bidirectional data buffers to set a flow direction of a signal from one to the other, thereby enabling said first computer system to write information into the devices of said second computer system or said shared RAM via said first bidirectional data buffer or to read information stored in the devices of said second computer system or said shared RAM, or, alternatively, enabling said second computer system to write information into the devices of said first computer system or said shared RAM via said second bidirectional data buffer or to read information stored in the devices of said first computer system or said shared RAM.

5. Combined two computer systems in accordance with claim 4, wherein either said first computer system or said second computer system executes a numerical control.

6. Combined two computer systems in accordance with claim 4, wherein one of said first computer system and said second computer system executes a numerical control, while the other is a computer system provided for preparing programs adapted to individual machines.

7. Combined two computer systems in accordance with claim 4, wherein the devices constituting said first and/or second computer systems include a work random access memory for the processor and also at least one of a local random access memory, a read only memory, an interrupt controller and a communication control integrated circuit.

* * * * *

UNITED STATES PATENT AND TRADEMARK OFFICE
CERTIFICATE OF CORRECTION

PATENT NO. : 5,726,895
DATED : March 10, 1998
INVENTOR(S) : Kumakura et al.

It is certified that error appears in the above-identified patent and that said Letters Patent is hereby corrected as shown below:

Title Page, [75], change "Oshino-mura," to --Yamanashi,--;

[56], after U.S. PATENT DOCUMENTS" insert

-- FOREIGN PATENT DOCUMENTS

| | | |
|---|---|---|
| 4-293104 | 10/92 | Jp. |
| 2-113304 | 04/90 | Jp. --. |

Col. 3, line 46, change "switch" to --switches,--.

Col. 7, line 49, after "the" (second occurrence) insert -- ROM,--;

line 55, change "PNC" to --PMC--; change "procedure" to --procedure. In--.

Signed and Sealed this

Twenty-second Day of September, 1998

Attest:

BRUCE LEHMAN

*Attesting Officer*          *Commissioner of Patents and Trademarks*